United States Patent
Vandermolen et al.

(10) Patent No.: US 11,827,305 B2
(45) Date of Patent: Nov. 28, 2023

(54) CABLE ROUTING SYSTEM OF BICYCLE AND STEM THEREOF

(71) Applicant: TIEN HSIN INDUSTRIES CO., LTD., Taichung (TW)

(72) Inventors: Mark Vandermolen, Taichung (TW); Hung-Mao Gu, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 254 days.

(21) Appl. No.: 17/147,160

(22) Filed: Jan. 12, 2021

(65) Prior Publication Data

US 2021/0129935 A1    May 6, 2021

Related U.S. Application Data

(63) Continuation of application No. 15/994,684, filed on May 31, 2018, now Pat. No. 10,953,948.

(51) Int. Cl.
| | |
|---|---|
| *B62K 19/32* | (2006.01) |
| *B62L 3/02* | (2006.01) |
| *B62M 25/02* | (2006.01) |
| *B60T 11/04* | (2006.01) |
| *B62K 23/02* | (2006.01) |
| *B62J 11/13* | (2020.01) |

(52) U.S. Cl.
CPC ............ *B62K 19/32* (2013.01); *B60T 11/046* (2013.01); *B62L 3/02* (2013.01); *B62M 25/02* (2013.01); *B62J 11/13* (2020.02); *B62K 23/02* (2013.01)

(58) Field of Classification Search
CPC ....... B62K 19/32; B62K 23/02; B60T 11/046; B62L 3/02; B62M 25/02; B62J 11/13
See application file for complete search history.

(56) References Cited

U.S. PATENT DOCUMENTS

| | | | | |
|---|---|---|---|---|
| 3,552,938 A | * | 1/1971 | Draca ...................... | E06B 9/01 428/167 |
| 4,201,397 A | * | 5/1980 | Matthias ................ | B62K 19/32 280/280 |

(Continued)

FOREIGN PATENT DOCUMENTS

| | | | | |
|---|---|---|---|---|
| EP | 2965981 A1 | * | 1/2016 | .............. B62J 11/13 |
| EP | 3552938 A1 | * | 10/2019 | .............. B62K 19/32 |

*Primary Examiner* — Minnah L Seoh
*Assistant Examiner* — Maurice L Williams
(74) *Attorney, Agent, or Firm* — Apex Juris, pllc; Hilde Coeckx

(57) ABSTRACT

A cable routing system of a bicycle, including a stem having a receiving space and an engaging hole communicating with the receiving space, a frame, a fork, an expander, and at least one cable. A head tube of the frame has a top portion having an upper mounting hole and a bottom portion having a lower mounting hole. The fork sequentially passes through the lower mounting hole, the upper mounting hole, and the engaging hole to be connected to the stem. The expander is disposed in a steering tube of the fork and has at least one cable passage communicating with the receiving space and the engaging hole. The cable extends into the steering tube from outside by passing through the receiving space and the cable passage. An end of the cable is connected to a bicycle controller, and another end thereof is connected to a bicycle component.

13 Claims, 13 Drawing Sheets

(56) References Cited

U.S. PATENT DOCUMENTS

| | | | | |
|---|---|---|---|---|
| 4,653,768 A * | 3/1987 | Keys | ............... | B62L 1/12 |
| | | | | 188/24.22 |
| 6,892,604 B2 * | 5/2005 | Tison | ............... | B62K 21/06 |
| | | | | 411/546 |
| 7,810,614 B1 * | 10/2010 | Li | ............... | B60T 11/06 |
| | | | | 188/2 D |
| 9,056,646 B1 * | 6/2015 | D'Aluisio | ............... | B62K 19/06 |
| 9,174,695 B1 * | 11/2015 | Wang | ............... | B62K 21/18 |
| 9,615,472 B1 * | 4/2017 | Calfee | ............... | B62K 21/18 |
| 2005/0057017 A1 * | 3/2005 | Hara | ............... | B62K 21/12 |
| | | | | 280/279 |
| 2005/0093269 A1 * | 5/2005 | Horiuchi | ............... | B62K 19/32 |
| | | | | 280/279 |
| 2005/0098979 A1 * | 5/2005 | Horiuchi | ............... | B62K 19/32 |
| | | | | 280/279 |
| 2005/0258617 A1 * | 11/2005 | Ueno | ............... | B62J 45/20 |
| | | | | 280/280 |
| 2006/0055146 A1 * | 3/2006 | Ueno | ............... | B62K 21/18 |
| | | | | 280/280 |
| 2006/0145446 A1 * | 7/2006 | Schmider | ............... | B62K 19/30 |
| | | | | 280/281.1 |
| 2007/0108723 A1 * | 5/2007 | Fukui | ............... | B62K 19/38 |
| | | | | 280/276 |
| 2007/0272451 A1 * | 11/2007 | Cauwet | ............... | B62K 21/08 |
| | | | | 180/6.24 |
| 2008/0179858 A1 * | 7/2008 | Chen | ............... | B62K 19/32 |
| | | | | 280/281.1 |
| 2009/0236817 A1 * | 9/2009 | French | ............... | B62K 21/02 |
| | | | | 280/279 |
| 2010/0194073 A1 * | 8/2010 | Corbin | ............... | B60T 11/043 |
| | | | | 280/279 |
| 2010/0269619 A1 * | 10/2010 | Corbin | ............... | B62K 19/32 |
| | | | | 74/473.13 |
| 2011/0121538 A1 * | 5/2011 | Giroux | ............... | B62K 23/06 |
| | | | | 280/280 |
| 2011/0162929 A1 * | 7/2011 | Moore | ............... | B60T 17/04 |
| | | | | 188/344 |
| 2012/0210821 A1 * | 8/2012 | Carlini | ............... | B62K 21/12 |
| | | | | 74/551.8 |
| 2013/0076000 A1 * | 3/2013 | Man | ............... | B62K 19/32 |
| | | | | 280/279 |
| 2013/0154234 A1 * | 6/2013 | Shadwell | ............... | B62J 99/00 |
| | | | | 280/279 |
| 2013/0240313 A1 * | 9/2013 | Moore | ............... | B60T 17/04 |
| | | | | 188/344 |
| 2014/0375017 A1 * | 12/2014 | Poss | ............... | B62K 19/30 |
| | | | | 280/281.1 |
| 2015/0128753 A1 * | 5/2015 | Goring | ............... | F16C 1/101 |
| | | | | 74/502.6 |
| 2015/0259022 A1 * | 9/2015 | Nago | ............... | B62K 21/12 |
| | | | | 74/551.1 |
| 2015/0259023 A1 * | 9/2015 | Nago | ............... | B62K 19/40 |
| | | | | 280/279 |
| 2015/0298758 A1 * | 10/2015 | Strien | ............... | B62J 11/19 |
| | | | | 280/279 |
| 2015/0367825 A1 * | 12/2015 | D'Aluisio | ............... | B62K 21/22 |
| | | | | 29/428 |
| 2017/0137081 A1 * | 5/2017 | Wen | ............... | B62K 19/32 |
| 2017/0151993 A1 * | 6/2017 | Iino | ............... | H05K 5/0204 |
| 2018/0118300 A1 * | 5/2018 | Lin | ............... | B62K 19/32 |
| 2018/0222546 A1 * | 8/2018 | Wong | ............... | B62K 21/22 |
| 2018/0273132 A1 * | 9/2018 | Huang | ............... | B62K 21/18 |
| 2019/0092417 A1 * | 3/2019 | Susse | ............... | B62K 21/02 |
| 2019/0233043 A1 * | 8/2019 | Huang | ............... | B62K 21/12 |
| 2019/0315436 A1 * | 10/2019 | Wu | ............... | B62K 21/12 |
| 2019/0367115 A1 * | 12/2019 | Kimmel | ............... | A45F 3/20 |
| 2019/0367121 A1 * | 12/2019 | Vandermolen | ............... | B60T 11/046 |
| 2019/0367122 A1 * | 12/2019 | Vandermolen | ............... | B62K 19/38 |
| 2020/0055562 A1 * | 2/2020 | Killing | ............... | B62K 21/125 |

* cited by examiner

CABLE ROUTING SYSTEM OF BICYCLE AND STEM THEREOF

BACKGROUND OF THE INVENTION

Technical Field

The present disclosure relates to a bicycle, and more particularly to a cable routing system of a bicycle and a stem thereof, which could avoid oversteering and prevent inner cables from resulting in interference during steering.

Description of Related Art

Most of conventional bicycle frames are hollow tubular structure, wherein the cables, such as a brake cable, a shift cable, etc., are typically fixed on outside of the bicycle frame. However, such design may cause corrosion of the cables, which shortens the service life of the cables. In addition, once the cables are fractured, which might endanger the safety of the driver.

In order to solve such problem, some manufacturers in the industry have developed a kind of bicycle frame having a plurality of holes, so that the cables could be disposed as inner cables by being passed through the bicycle frame via the holes. However, a diameter of an inner tube of the bicycle frame is usually much greater than a diameter of the cables, so that the cables cannot be firmly fixed in the bicycle frame, and it is noisy due to vibration during riding.

In addition, said inner cables will be moved along with a cable routing system of the bicycle during steering, so that the cables may be rubbed against the bicycle frame or be cut. Moreover, a friction between the cables and the bicycle frame could cause interference during steering, which is discomforted and is unsafe.

BRIEF SUMMARY OF THE INVENTION

In view of the above, the primary objective of the present disclosure is to provide a cable routing system of a bicycle, wherein the cable routing system includes a stem, a spacer, a frame (especially a head tube), and a fork. When the cable routing system is steered, an inner cable could be prevented from causing interference during steering, and the head could be prevented from oversteering, which extends a service lives of the inner cable and maintains integrity of the bicycle, providing a better appearance.

The present disclosure provides a stem of a bicycle, wherein the bicycle includes a handlebar, a frame including a head tube, and a fork. The stem has a receiving space therein. An end of the stem has a first clamping member and a second clamping member, wherein the first clamping member is adapted to be engaged with the second clamping member to fix the handlebar; another end of the stem has an engaging hole communicating with the receiving space. The head tube has a top portion and a bottom portion, wherein the top portion has an upper mounting hole, and the bottom portion has a lower mounting hole. The fork includes a steering tube, which sequentially passes through steering tube, the lower mounting hole, the upper mounting hole, and the engaging hole to be connected to the stem, so that the stem is engaged with the steering tube and is located on the top portion of the head tube. The stem further includes a communicating hole disposed on a side of the stem having the engaging hole, wherein the communicating hole and the engaging hole are disposed separately, and the communicating hole communicates with the receiving space of the stem.

In an embodiment, further including a body and a top cap, wherein the body has the engaging hole and the communicating hole. The top cap covers the engaging hole from a top of the body, and is fixed on the body by a fixing bolt, wherein an inner surface of the top cap facing the engaging hole and a portion of the body which is provided with the engaging hole are spaced from each other by a gap.

In an embodiment, a shape of the top cap matches with a shape of the body, and a top surface of the top cap is a substantially smooth surface, which is adapted to lower a wind resistance.

In an embodiment, the gap between the top cap and the body is no less than 3 mm.

In an embodiment, further including an expander disposed in the steering tube of the fork and is located in the engaging hole. The fixing bolt is screwed with the expander, so that an outer diameter of the expander expands to be tightly fixed in the steering tube, wherein the expander has at least one cable passage. The at least one cable passage communicates with the receiving space via the engaging hole, and is capable of being passed through by a cable which enters an inside of the steering tube via the receiving space.

In an embodiment, the first clamping member is disposed with a first notch, and a first inner threading groove is disposed in the first notch of the first clamping member. The second clamping member is disposed with a second notch, and a second inner threading groove is disposed in the second notch of the second clamping member. The handlebar is located in the first notch and the second notch by engaging the first clamping member with the second clamping member, wherein the first inner threading groove and the second inner threading groove form a first hole which communicates the receiving space and outside of the stem, so that the cable is capable of entering the receiving space via the first hole from outside of the stem.

In an embodiment, a side of the first clamping member is disposed with at least one first outer threading groove, and a side of the second clamping member is disposed with at least one second outer threading groove, wherein by engaging the first clamping member and the second clamping member, the at least one first outer threading groove and the at least one second outer threading groove form at least one second hole which communicates the receiving space and outside of the stem, so that the cable is capable of entering the receiving space via the second hole from outside of the stem.

In an embodiment, the communicating hole is curved in shape and has a central angle of no less than 45 degrees and no greater than 135 degrees.

In an embodiment, a maximum width of the communicating hole is no less than 3 mm and no greater than 30 mm.

In an embodiment, a gap between the engaging hole and the communicating hole is no less than 0.1 mm and no greater than 30 mm.

In an embodiment, a width of the at least one cable passage of the expander is no less than 2 mm and no greater than 10 mm.

The present disclosure further provides a cable routing system of a bicycle, which includes a stem, a frame, a fork, an expander, and at least one cable. The stem includes a body and a top cap, wherein the body has an engaging hole and a communicating hole which are disposed separately. A shape of the top cap matches with a shape of the body; the top cap is fixed on the body by a fixing bolt. The top cap and the body are enclosed to form a receiving space communicating with the engaging hole. The frame includes a head tube, wherein the head tube has a top portion and a bottom portion. The top portion has an upper mounting hole, and the bottom portion has a lower mounting hole. The fork includes a steering tube, wherein the steering tube sequentially passes through the lower mounting hole, the upper mounting hole, and the engaging hole to be connected to the stem, so that the stem is engaged with the steering tube and is located on the top portion of the head tube. The expander is disposed in the steering tube of the fork by being screwed with the fixing bolt, wherein the expander has at least one cable passage, which communicates with the receiving space and the engaging hole. The at least one cable extends into the steering tube from outside by passing through the receiving space of the stem and the at least one cable passage. An end of the at least one cable is connected to a bicycle controller, and another end thereof is connected to a bicycle component.

In an embodiment, the body further includes a first clamping member and a second clamping member. A first inner threading groove is disposed in a first notch of the first clamping member, and a second inner threading grooves is disposed in a second notch of the second clamping member. By engaging the first clamping member with the second clamping member, the first inner threading groove and the second inner threading groove form a first hole communicating the receiving space and an outside of the stem, so that the at least one cable is capable of entering the receiving space via the first hole from outside of the stem.

In an embodiment, the body further includes a first clamping member and a second clamping member. A side of the first clamping member is disposed with at least one first outer threading groove, and a side of the second clamping member is disposed with at least one second outer threading groove. By engaging the first clamping member with the second clamping member, the at least one first outer threading groove and the at least one second outer threading groove forms at least one second hole communicating the receiving space and outside of the stem, so that the at least one cable is capable of entering the receiving space via the at least one second hole from outside of the stem.

In an embodiment, the bicycle further includes at least one spacer disposed between the stem and the head tube. The at least one spacer has a first hole. The steering tube sequentially passes through the head tube and the first hole of the at least one spacer to be connected to the stem; the at least one spacer further includes at least one second hole. The at least one second hole and the first hole are disposed on and spaced from each other by a distance, wherein the at least one second hole communicates with the head tube of the frame and the receiving space of the stem.

In an embodiment, the stem has a first positioning portion, and the at least one spacer has a second positioning portion which is adapted to be engaged with the first positioning portion.

The present disclosure further provides a cable routing system of another bicycle, which includes a side surface of the at least one spacer opposite to the second positioning portion is disposed with a third positioning portion, which is adapted to be engaged with a second positioning portion of another spacer.

The present disclosure further provides a cable routing system of a bicycle, including a stem and at least one cable. The stem includes a body and a top cap; the body has an engaging hole and a communicating hole which are disposed separately. A shape of the top cap matches with a shape of the body. The top cap is fixed on the body by a fixing bolt. The top cap and the body are enclosed to form a receiving space communicating with the engaging hole. The stem further includes a first clamping member and a second clamping member. A first inner threading groove is formed inside of the first clamping member, and at least one first outer threading groove is formed on a side of the first clamping member. A second inner threading groove is formed inside of the second clamping member, and at least one second outer threading groove is formed on a side of the second clamping member. The first inner threading groove is engaged with the second inner threading groove to form a first hole, and the at least one first outer threading groove is engaged with the at least one second outer threading groove to form a second hole. The at least one cable extends out of the stem via the second hole by sequentially passing through the first hole and the receiving space of the stem from outside. An end of the at least one cable is connected to a bicycle controller, and another end thereof is connected to a bicycle component.

With the aforementioned design, when the cable routing system of the bicycle is steered by a driver, the inner cable could be prevented from causing interference during steering, and the head could be prevented from oversteering, which extends a service lives of the inner cable.

BRIEF DESCRIPTION OF THE SEVERAL VIEWS OF THE DRAWINGS

The present disclosure will be best understood by referring to the following detailed description of some illustrative embodiments in conjunction with the accompanying drawings, in which.

DETAILED DESCRIPTION OF THE INVENTION

Figure 1:
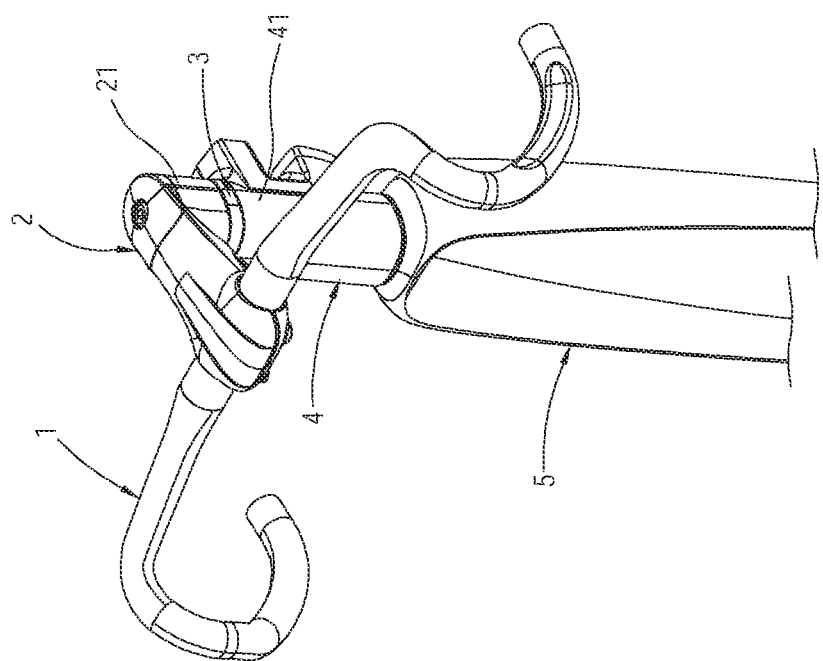
FIG. 1 is a perspective view of the cable routing system of the bicycle according to an embodiment of the present disclosure.

A cable routing system of a bicycle according to an embodiment according to the present disclosure is illustrated in FIG. 1, wherein the cable routing system is adapted for steering control and includes a handlebar 1, a stem 2, a spacer 3, a frame 4, and a fork 5.

Figure 2:
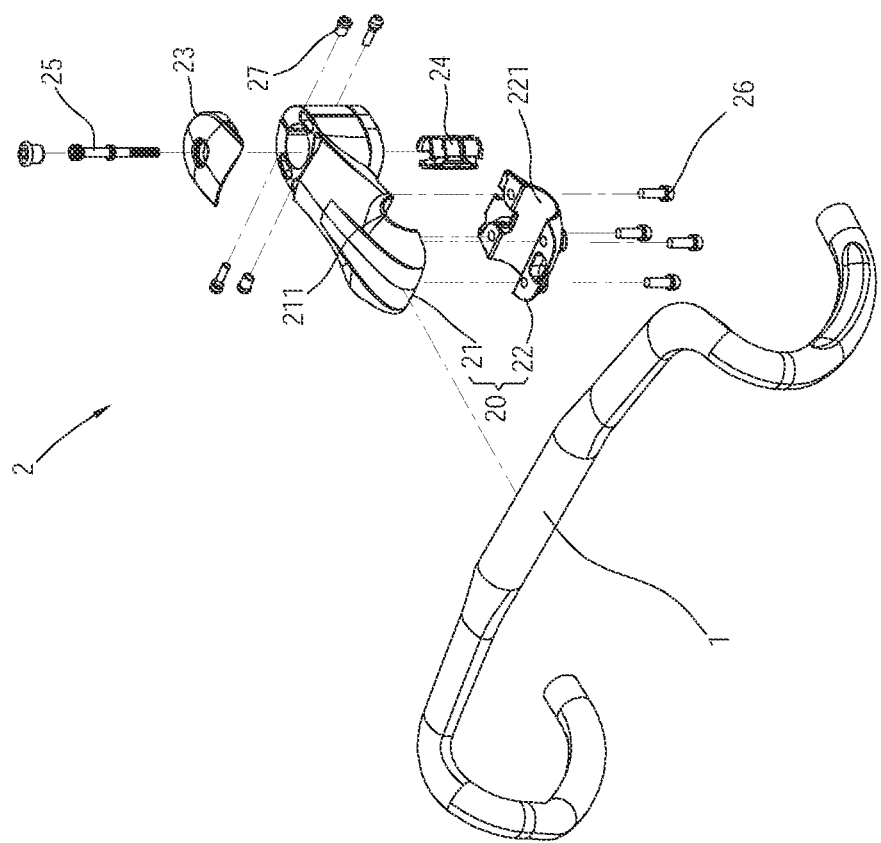
FIG. 2 is an exploded view, showing the handlebar and the stem according to the embodiment of the present disclosure.

As shown in FIG. 2, the stem 2 includes a body 20, a top cap 23, an expander 24, and a fixing bolt 25. The body 20 includes a first clamping member 21 and a second clamping member 22. A first notch 211 is recessed into the first clamping member 21, wherein four threaded holes (not shown) are disposed around the first notch 211 of the first clamping member 21. A second notch 221 is recessed into the second clamping member 22, wherein four holes corresponding to the threaded holes are disposed around the second notch 221 of the second clamping member 22. The handlebar 1 is disposed in a space formed by the first notch 211 and the second notch 221, and each of four bolts 26 is screwed into the corresponding threaded hole by sequentially passing through the corresponding hole. In this way, a wall of the second notch 221 and a wall of the first notch 211 could press the handlebar 1 at the same time, whereby to fix the handlebar 1.

Figure 3:
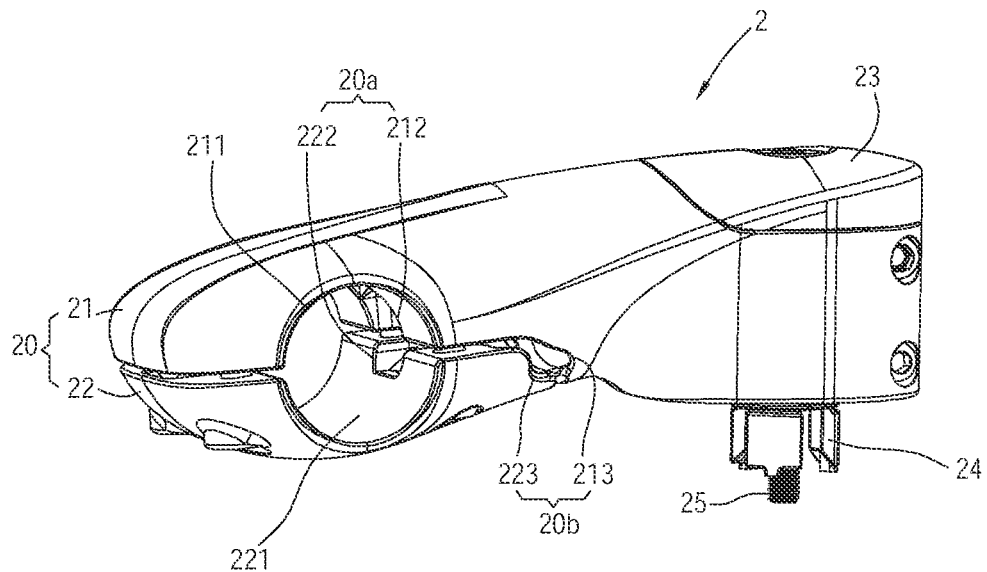
FIG. 3 is a perspective view of the stem according to the embodiment of the present disclosure.

In addition, the first clamping member 21 is hollow inside. As shown in FIG. 3, a first inner threading groove 212 is formed on an inner side of the first notch 211 of the first clamping member 21, and on each of two opposite sides of the first clamping member 21 facing two opposite directions is formed with a first outer threading groove 213. A second inner threading groove 222 is formed inside the second notch 221 of the second clamping member 22 at where the first inner threading groove 212 corresponds to, and on each of two opposite sides of the second clamping member 22 facing two opposite directions has a second outer threading groove 223. Whereby, the first inner threading groove 212 could be combined with the second inner threading groove 222 to form a first hole 20a which communicates an inside and an outside of the first clamping member 21, and the first outer threading groove 213 is disposed in conjunction with the second outer threading groove 223 to form a second hole 20b communicating with the inside and the outside of the body 20.

Figure 4:
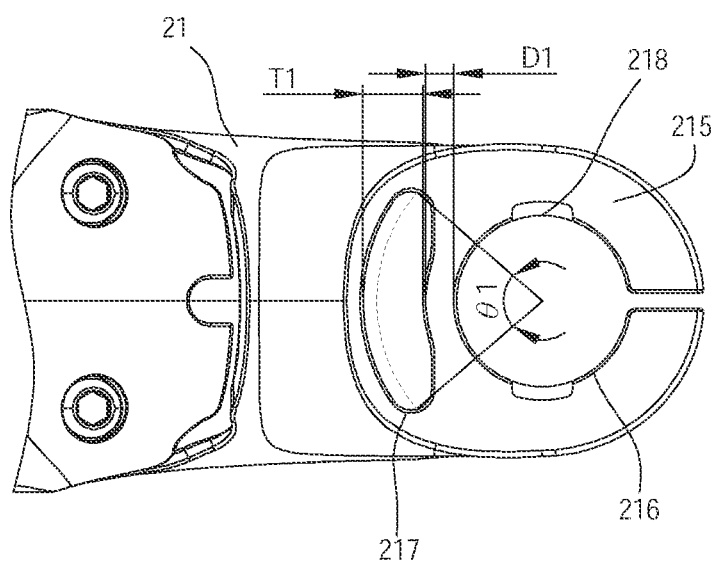
FIG. 4 is a bottom view of the body of the stem according to the embodiment of the present disclosure.
Figure 5:
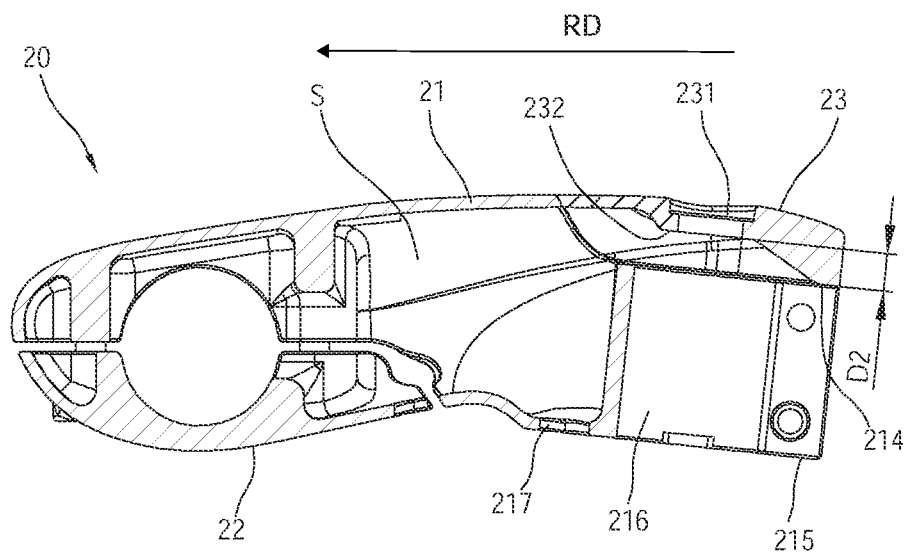
FIG. 5 is a sectional view of the body of the stem according to the embodiment of the present disclosure.
Figure 6:
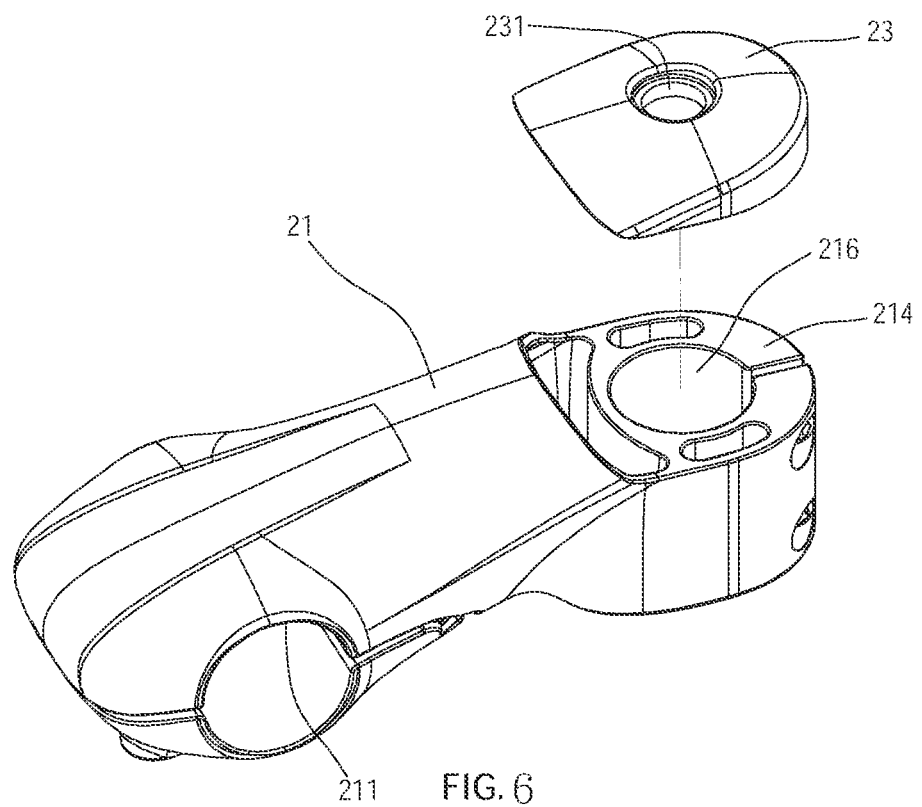
FIG. 6 is a partially exploded view of the body of the stem according to the embodiment of the present disclosure.

Moreover, as shown in FIG. 4 to FIG. 6, another end of the first clamping member 21 of the body 20, which is opposite to the first notch 211, has a top portion 214 and a bottom portion 21, wherein the top portion 214 is exposed to the outside; the bottom portion 215 is disposed on another side of the first clamping member 21 of the body 20 and is opposite to the top portion 214; the bottom portion 215 has an engaging hole 216 and a communicating hole 217 which are disposed separately. In the current embodiment, the engaging hole 216 is circular and passes through the bottom portion 215 and the top portion 214. Two first positioning portions 218 are symmetrically disposed around the engaging hole 216 of the first clamping member 21. In the current embodiment, each of the first positioning portions 218 is a recess. As shown in FIG. 4, the communicating hole 217 is curved in shape and has a central angle θ1 of about 80 degrees, wherein a maximum width T1 of the communicating hole 217 is about 15 mm. Also, the communicating hole 217 and an opening of the engaging hole 216 are spaced from each other by a gap D1, wherein said gap D1 is about 5 mm.

As shown in FIG. 5 and FIG. 6, the top cap 23 is disposed on the first clamping member 21 to cover the top portion 214 of the first clamping member 21, wherein the shape of the top cap 23 matches with the shape of the first clamping member 21. A top surface of the top cap 23 is a substantially smooth surface, whereby to lower the wind resistance. The top cap 23 has a fixing hole 231 directly facing the engaging hole 216, so that the fixing bolt 25 could be inserted into the engaging hole 216 by passing through the fixing hole 231. In addition, the top cap 23 and the body 20 are enclosed to form a receiving space S communicating with the engaging hole 216 and the communicating hole 217. In the current embodiment, an inner surface 232 of the top cap 23, which faces the engaging hole 216, and the top portion 214 of the first clamping member 21 are spaced from each other by a gap D2, wherein said gap D2 is about 10 mm.

Figure 7:
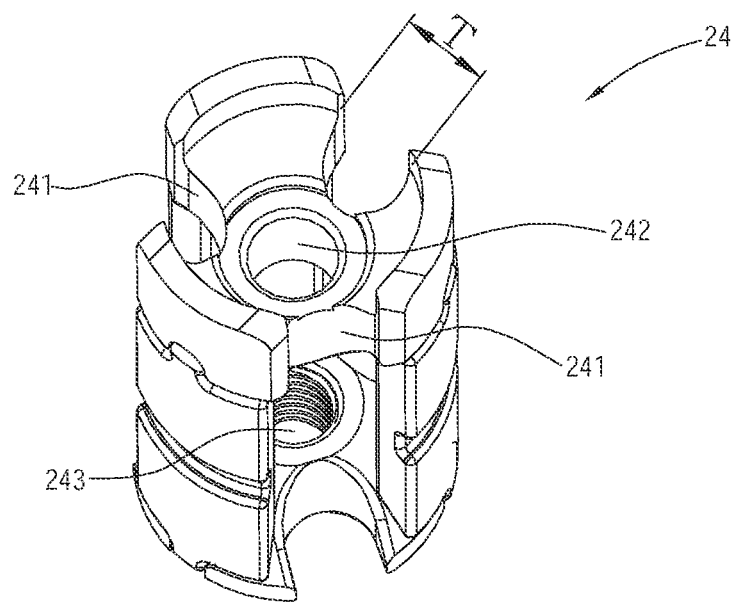
FIG. 7 is a perspective view of the expander according to the embodiment of the present disclosure.

As shown in FIG. 7, three cable passages 241 are arranged at regular intervals along a peripheral wall of the expander 24, wherein a width T of each of the cable passages 241 is about 5 mm. The expander 24 has a passing hole 242 on a top end thereof, and the expander 24 has a threaded hole 243 on a bottom end thereof. When the fixing bolt 25 screws into the threaded hole 243, an outer diameter of the expander 24 would expand. How to expand the outer diameter is a well-known skill, thus we are not going to describe it in details herein.

Figure 8:
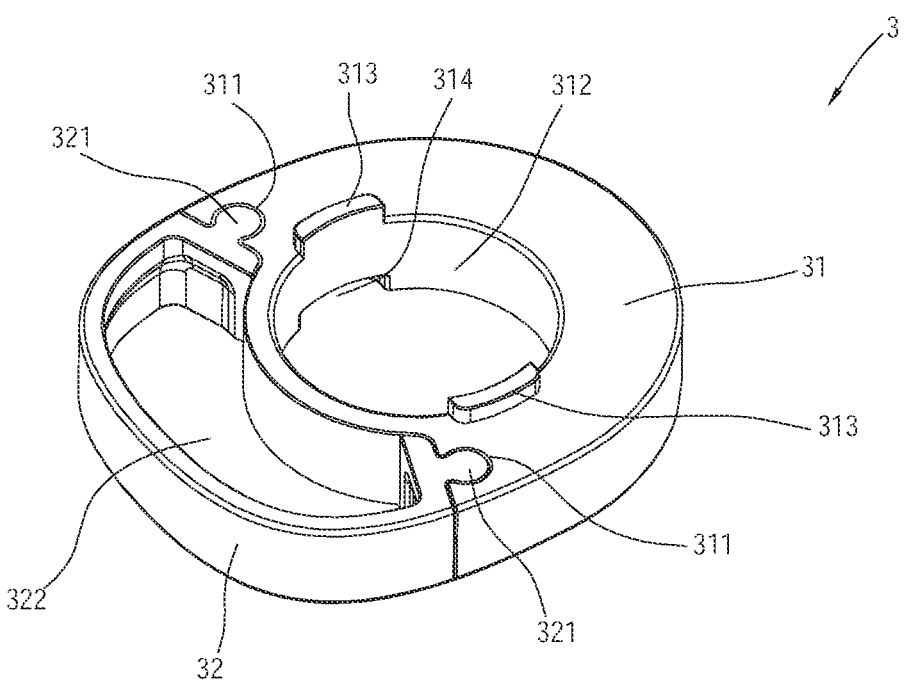
FIG. 8 is a perspective view of the spacer according to the embodiment of the present disclosure.

As shown in FIG. 1, a top portion of the spacer 3 abuts against and faces toward the bottom portion 215 of the first clamping member 21. As shown in FIG. 8, the spacer 3 includes a first section 31 and a second section 32 engaged with the first section 31. More specifically, two first engaging portions 311 are symmetrically disposed on the first section 31, and two second engaging portions 321 are symmetrically disposed on the second section 32 to be connected to the first engaging portions 311, wherein the shape of the second engaging portions 321 is complementary to that of the first engaging portions 311, so that the second section 32 could be firmly engaged with the first section 31. In addition, the first section 31 is made of a material having a first elastic coefficient, and the second section 32 is made of a material having a second elastic coefficient, wherein the second elastic coefficient is greater than the first elastic coefficient. More specifically, the first section 31 is made of carbon fiber, glass fiber, or metal materials, and the second section 32 is made of rubber, resin, or synthetic resin.

In addition, a first hole 312 is formed on the first section 31, and directly faces the engaging hole 216; a second hole 322 is formed on the second section 32, and directly faces the communicating hole 217. In the current embodiment, the first hole 312 is circular, and two second positioning portions 313 are symmetrically disposed on a periphery of the first hole 312, wherein each of the second positioning portions 313 is a protrusion adapted to be engaged with the first positioning portions 218 (i.e., the recesses) of the stem 2, whereby to facilitate alignment during the assembling process.

Figure 9:
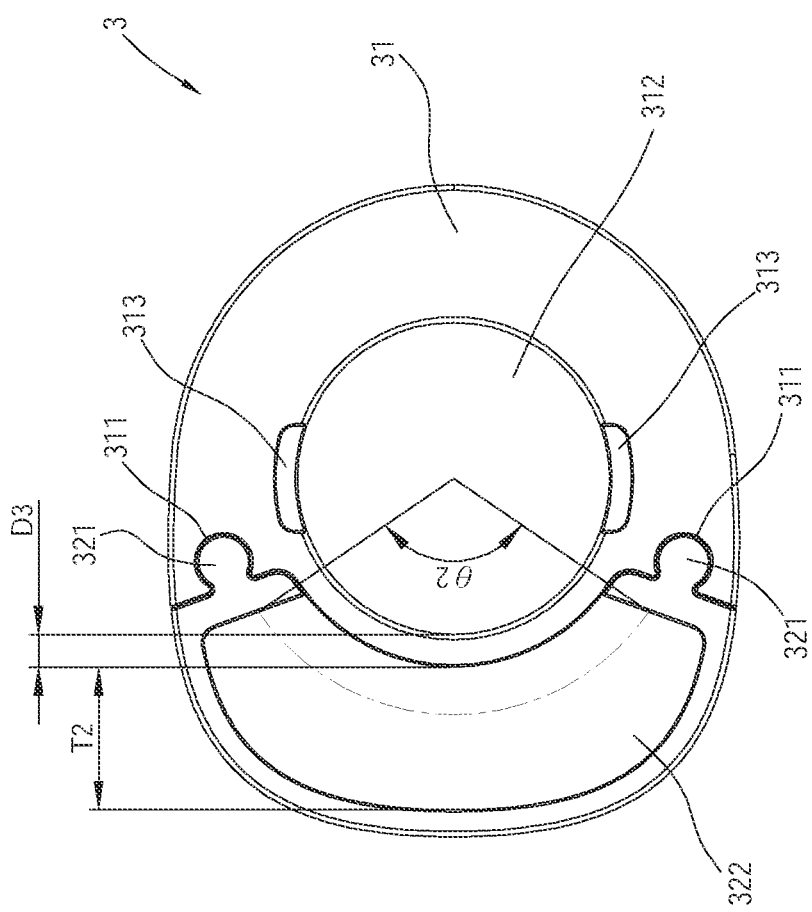
FIG. 9 is a top view of the spacer according to the embodiment of the present disclosure.

Moreover, as shown in FIG. 9, the second hole 322 and the first hole 312 are spaced from each other by a distance D3, wherein said distance D3 is about 5 mm. Also, the second hole 322 is curved in shape and has a central angle θ2 of about 100 degrees, wherein a maximum width T2 of the second hole 322 is about 15 mm.

Figure 10:
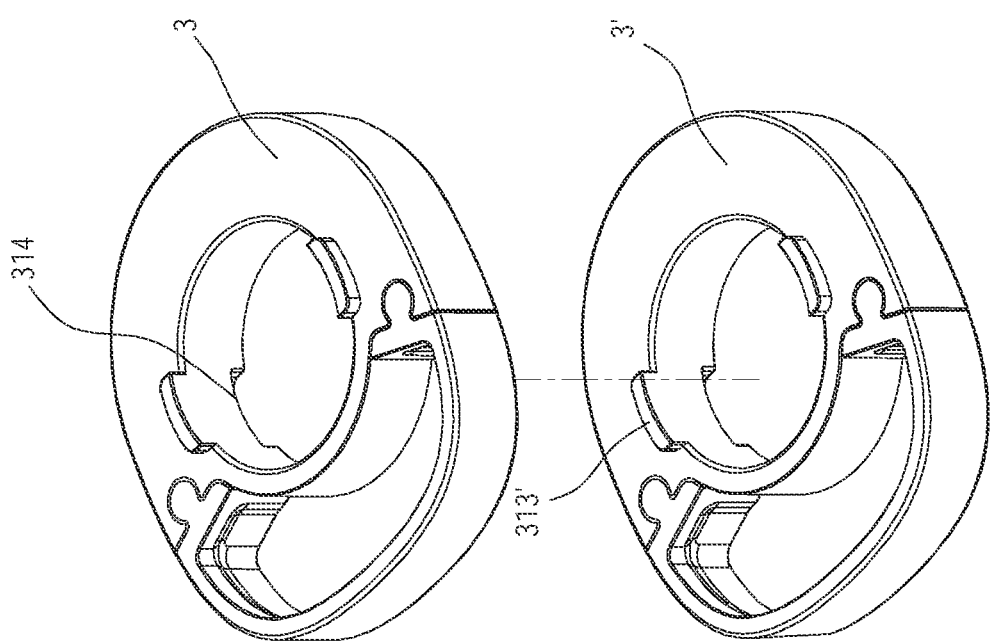
FIG. 10 is a perspective view, showing that the spacer could be stacked on another spacer.

As shown in FIG. 8, on another surface of the first portion 31, two third positioning portions 314, each of which is a recess, are symmetrically disposed on the periphery of the first through hole 312 corresponding to the second positioning portions 313. As shown in FIG. 10, each of the third positioning portions 314 is adapted to be engaged with one of two second positioning portions 313' of another spacer 3 which has the same structures as the spacer 3. In this way, the number of the spacer 3, 3' could be increased to meet specific requirements, so as to adjust a height of the stem 2.

Figure 11:
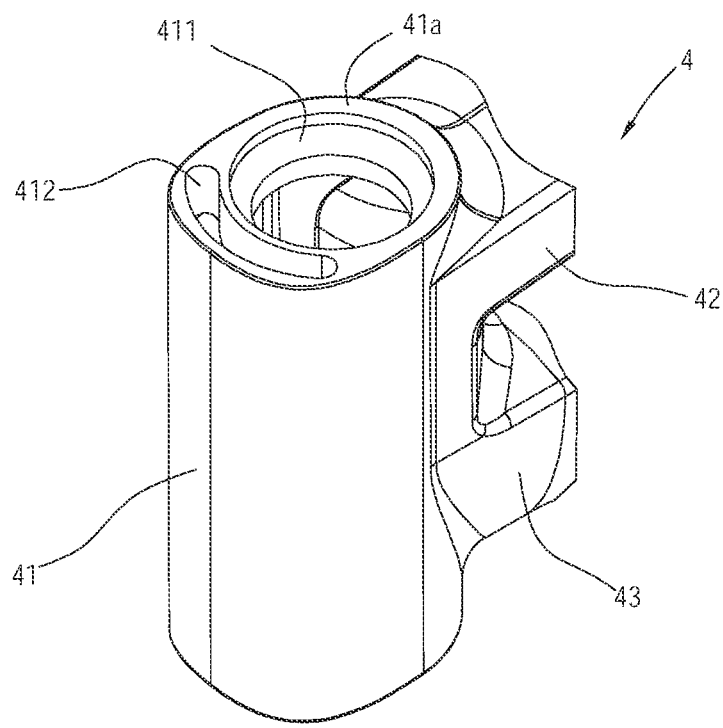
FIG. 11 is a perspective view of the frame according to the embodiment of the present disclosure.
Figure 12:
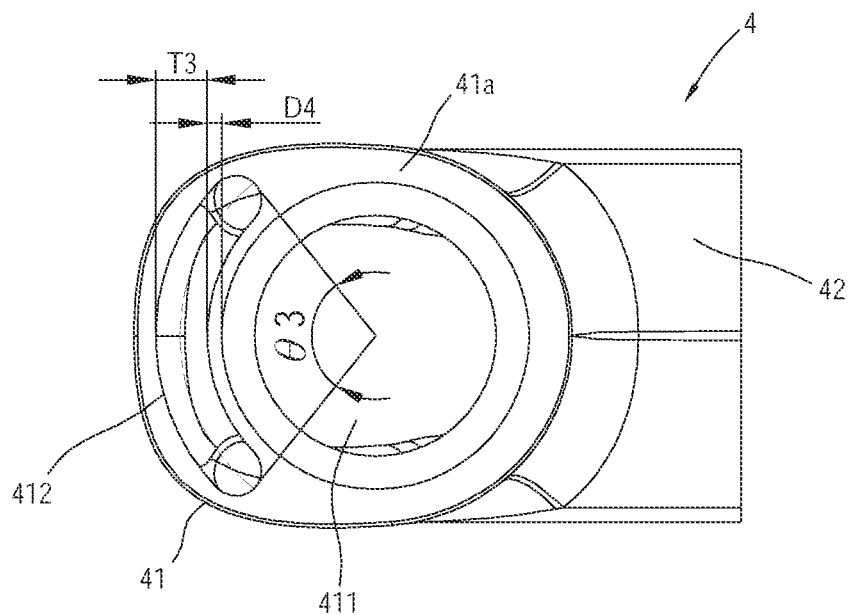
FIG. 12 is a top view of the frame according to the embodiment of the present disclosure.

As shown in FIG. 11 to FIG. 15, the cable routing system of the frame 4 mainly includes a head tube 41, a top tube 42, and a down tube 43, wherein the top tube 42 is connected to an upper section of the head tube 41, and the down tube 43 is connected to a lower section of the head tube 41. As shown in FIG. 1 and FIG. 11, a top portion 41a of the head tube 41 abuts against and faces toward a bottom of the spacer 3, so that the spacer 3 is located between the stem 2 and the head tube 41 of the frame 4. In addition, as shown in FIG. 11 and FIG. 12, the top portion 41a of the head tube 41 has an upper mounting hole 411 and a through hole 412, wherein both of the upper mounting hole 411 and the through hole 412 of the head tube 41 communicate with an inside of the head tube 41. In the current embodiment, the upper mounting hole 411 is circular and is adapted to support a ball bearing. Moreover, the through hole 412 of the head tube 41 is curved in shape and has a central angle θ3 of about 100 degrees, wherein a maximum width T3 of the through hole 412 of the head tube 41 is about 15 mm. Also, the through hole 412 of the head tube 41 and the upper mounting hole 411 are spaced from each other by a distance D4, wherein said distance D4 is about 5 mm.

Figure 13:
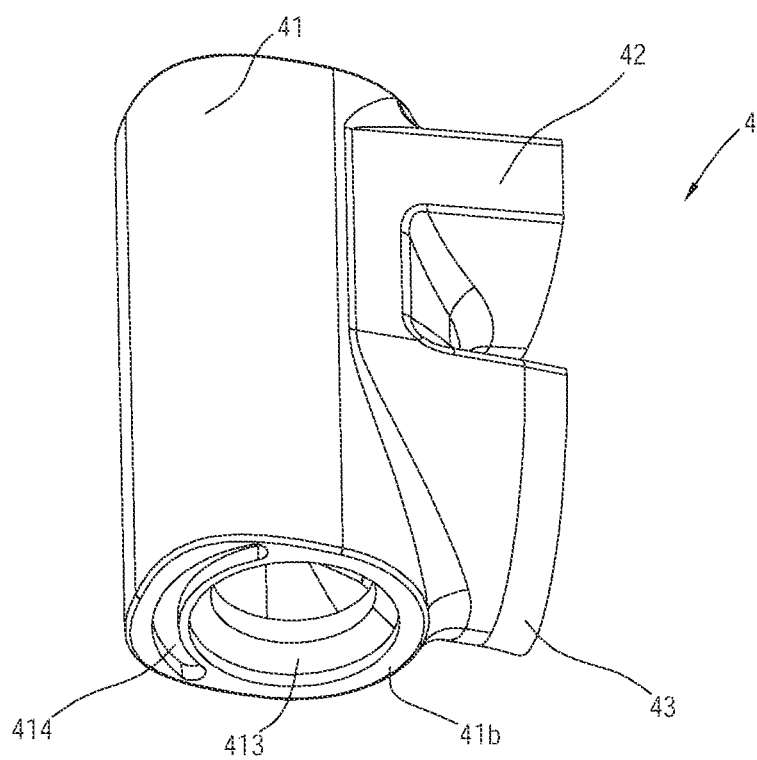
FIG. 13 is a perspective bottom view of the frame according to the embodiment of the present disclosure.
Figure 14:
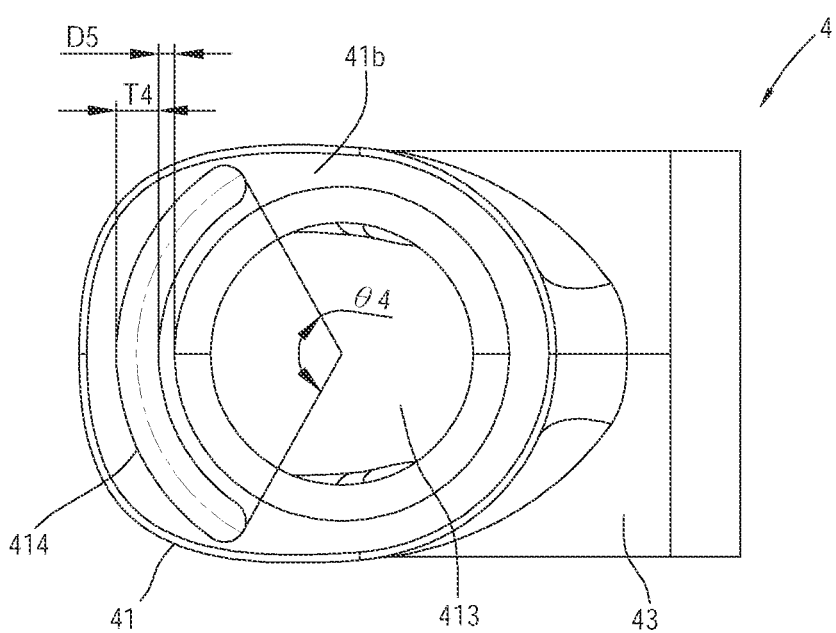
FIG. 14 is a bottom view of the frame according to the embodiment of the present disclosure.
Figure 15:
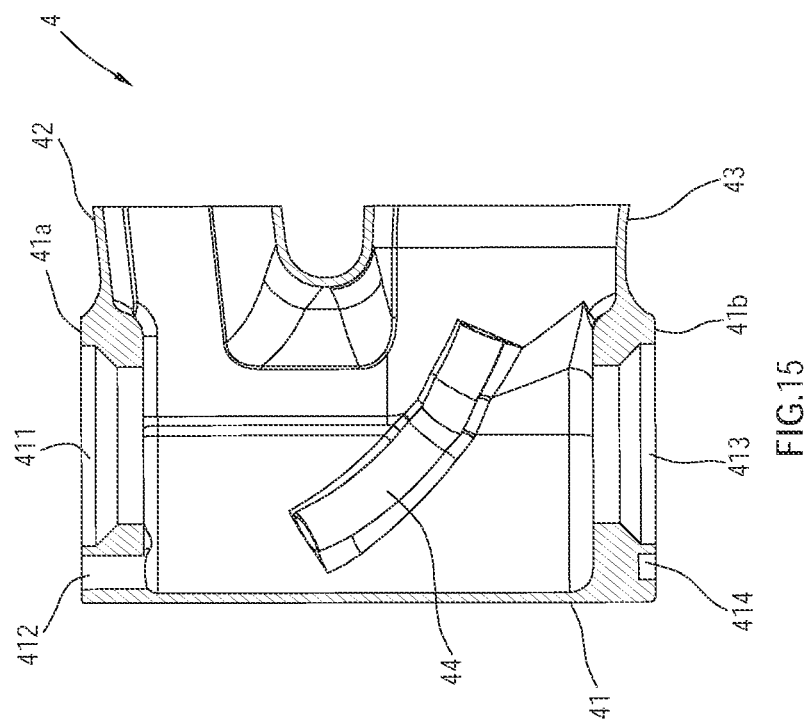
FIG. 15 is a sectional view of the frame according to the embodiment of the present disclosure.

As shown in FIG. 13 and FIG. 14, a bottom portion 41b of the head tube 41 has a lower mounting hole 413 and a first blocking portion 414 which are separately disposed. In the current embodiment, the lower mounting hole 413 is circular and communicates with the inside of the head tube 41 and is adapted to support another ball bearing. In the current embodiment, the first blocking portion 414 is curved in shape and has a central angle θ4 of about 110 degrees, wherein the first blocking portion 414 is disposed without physically communicating with the inside of the head tube 41. Also, a maximum width T4 of the first blocking portion 414 is about 10 mm, and the first blocking portion 414 and the lower mounting hole 413 are spaced from each other by a distance D5, wherein said distance D5 is about 5 mm. In addition, as shown in FIG. 15, two guiding tubes 44 are symmetrically disposed inside of the frame 4, wherein an end of each of the guiding tubes 44 is located in the head tube 41 and extends slightly toward the top portion 41a of the head tube 41, and another end of each of the guiding tubes 44 extends slightly toward the down tube 43. In the current embodiment, a diameter of each of the guiding tubes 44 is 5 mm. However, the diameter of each of the guiding tubes is not a limitation of the present disclosure. In other embodiments, the diameter of each of the guiding tubes can be, preferably, no less than 2 mm and no greater than 10 mm.

Figure 16:
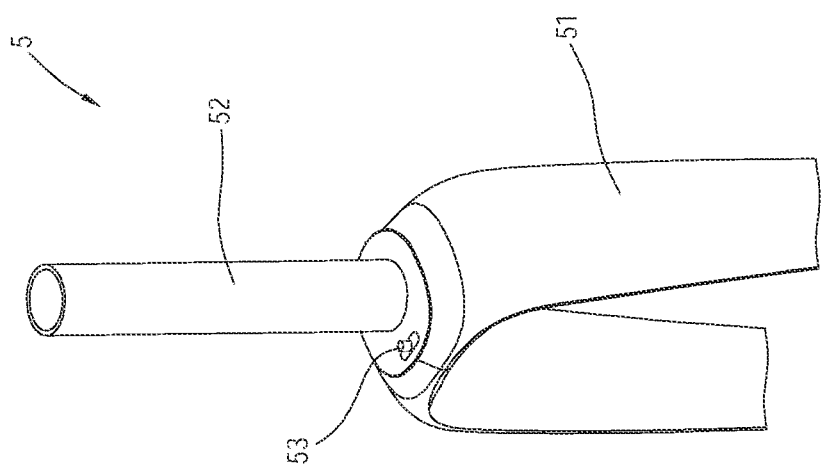
FIG. 16 is a perspective view of the fork according to the embodiment of the present disclosure.

As shown in FIG. 16, the fork 5 has a fork portion 51 and a steering tube 52 connected to the fork portion 51, wherein the fork portion 51 is adapted to be connected to a wheel (not shown). A second blocking portion 53 is disposed adjacent to a junction of the fork portion 51 and the steering tube 52. In the current embodiment, the second blocking portion 53 is a columnar protrusion, and its size is slightly smaller than the width of the first blocking portion 414.

Figure 17:
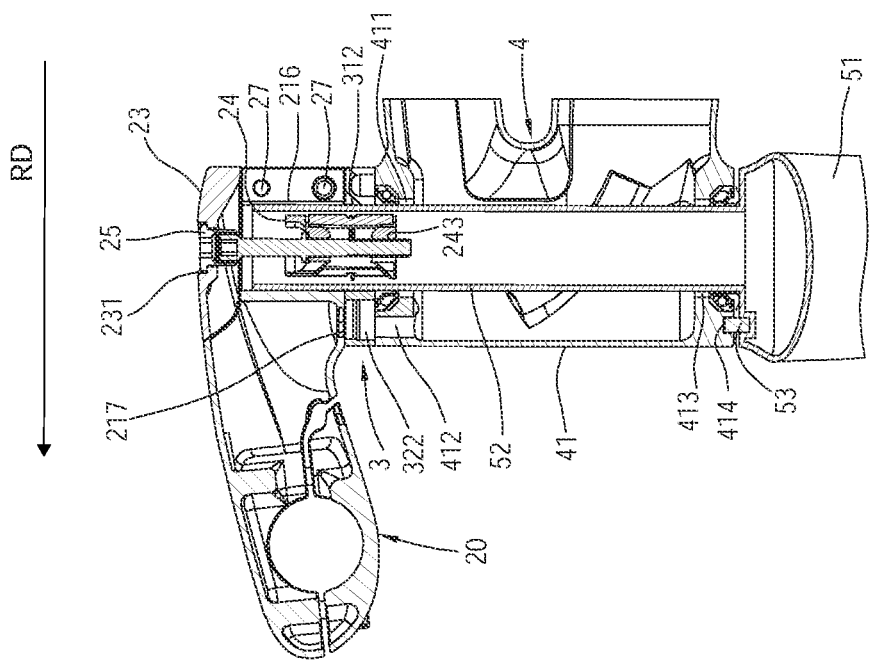
FIG. 17 is a sectional view, showing the structural relationships between the stem, the spacer, the frame, and the fork.
Figure 18:
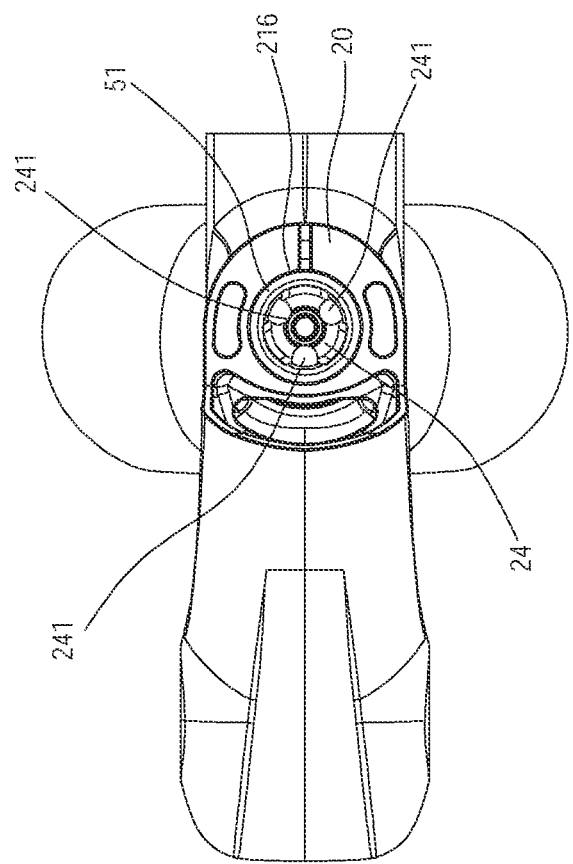
FIG. 18 is a top view, showing the expander is buried into the top tube.
Figure 19:
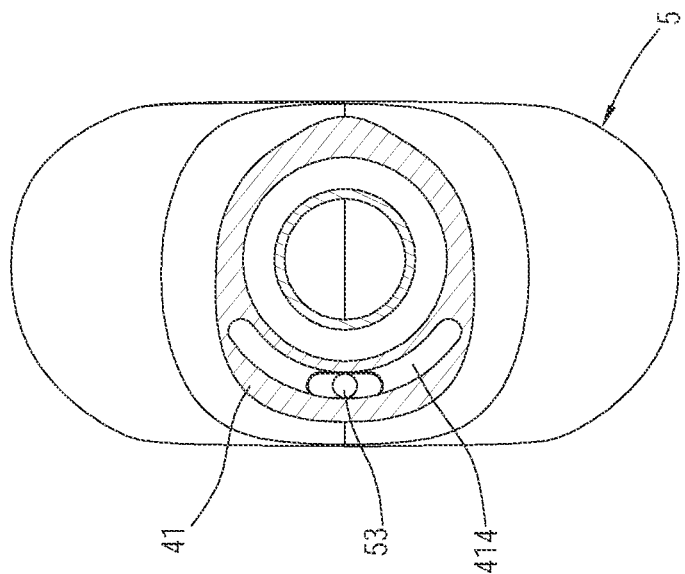
FIG. 19 is a sectional view, showing the second blocking portion is disposed in the first blocking portion.

In this way, as shown in FIG. 17, when the spacer 3 and the body 20 of the stem 2 are sequentially stacked on the top portion 41a of the head tube 41, the first hole 312 of the spacer 3 would communicate the upper mounting hole 411 of the head tube 41 and the engaging hole 216 of the stem 2, and the second hole 322 of the spacer 3 would communicate the through hole 412 of the head tube 41 with the communicating hole 217 of the body 20. After that, the steering tube 52 of the fork 5 could be installed into the engaging hole 216 of the body 20 by passing through the ball bearings disposed in the lower mounting hole 413 and the upper mounting hole 411, and the first hole 312 of the spacer 3 sequentially. Then, as shown in FIG. 18, the expander 24 is embedded into the steering tube 52. When the top cap 23 is provided on the body 20 of the stem 2, the fixing bolt 25 is screwed into the threaded hole 243 of the expander 24 by passing through the fixing hole 231 and the engaging hole 216, so that the outer diameter of the expander 24 is expanded to be tightly fixed in the steering tube 52. A bolt assembly 27 is screwed to the body 20 of the stem 2 to reduce a diameter of the engaging hole 216, so that an inner wall of the engaging hole 216 pinches an outer wall of the steering tube 52 of the fork 5, whereby to fix the components of the head. After the assembling is completed, the second blocking portion 53 of the fork 5 is located in the first blocking portion 414 of the head tube 41, as shown in FIG. 19, so that when the fork 5 is rotated, the second blocking portion 53 could move along the first blocking portion 414.

With the aforementioned design, drivers can design their cable arrangements with the methods shown in FIG. 20 to FIG. 24 depending on the requirement. Typically, an end of a cable is connected to a bicycle controller such as a shifter, a controller of a dropper post, a brake lever, etc., and another end of the cable is connected to a bicycle component such as a derailleur, a brake, a dropper post, etc.

Figure 20:
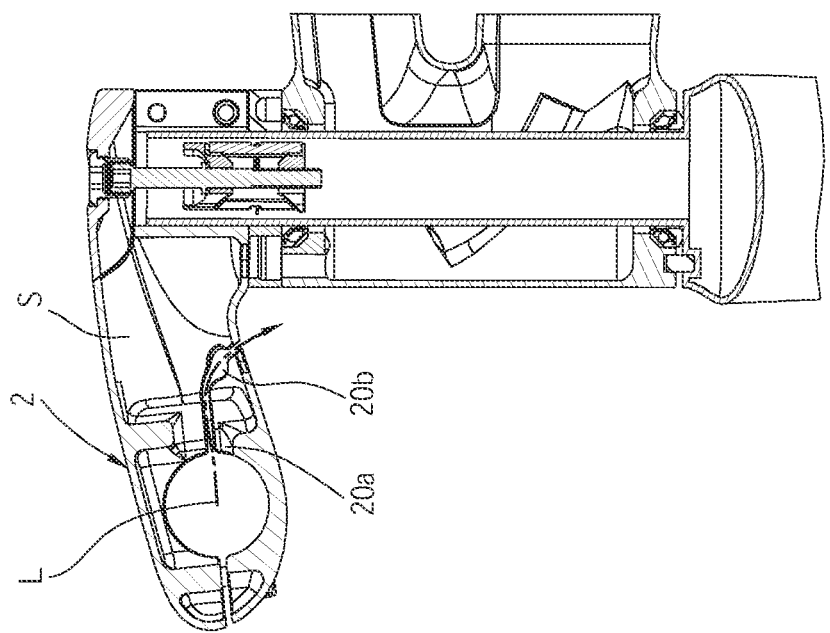
FIGS. 20-24 are sectional views, showing various cable arrangements according to the embodiment of the present disclosure.

The cable arrangement shown in FIG. 20 includes inserting a cable L into the receiving space S of the stem 2 through the first hole 20a, and then pulling the cable L out of the stem 2 via the second hole 20b. Such a cable arrangement is suitable for cable management.

Figure 21:
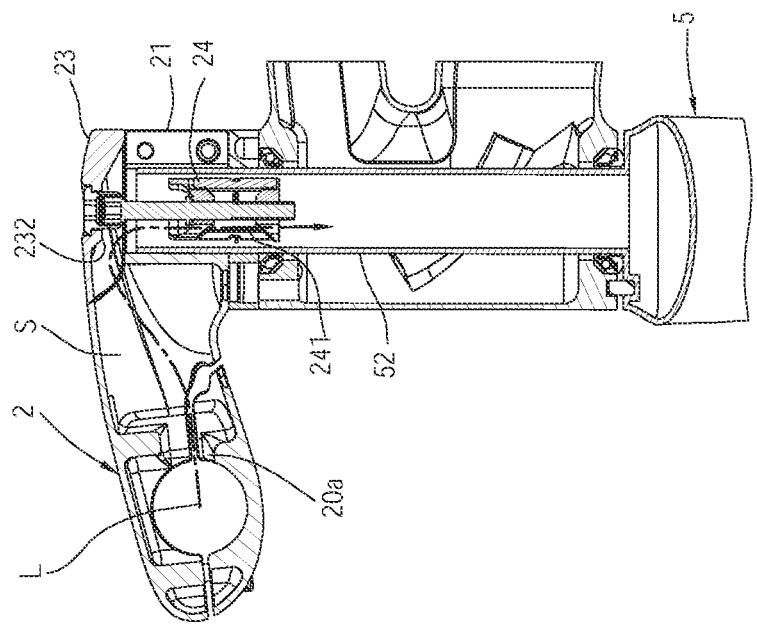

The cable arrangement shown in FIG. 21 includes inserting the cable L into the receiving space S of the stem 2 through the first hole 20a, passing the cable L through a gap D2 between the top cap 23 and the first clamping member 21, and then pulling the cable L into the steering tube 52 of the fork 5 through the cable passages 241 on the peripheral wall of the expander 24. Such a cable arrangement is suitable for hiding front brake cables.

Figure 22:
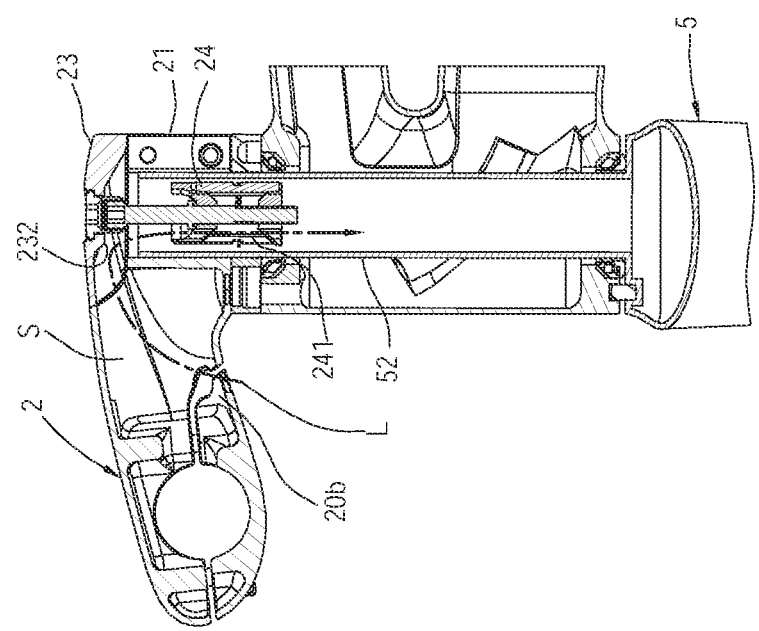

The cable arrangement shown in FIG. 22 is almost the same as the cable arrangement shown in FIG. 21, except that the cable L is inserted into the receiving space S of the stem 2 by passing through the second hole 20b of the stem 2. Subsequently, the cable L is also pulled through the gap D2 between the top cap 23 and the first clamping member 21, and then is inserted into the steering tube 52 through the cable passages 241 on the peripheral wall of the expander 24. Such a cable arrangement is also suitable for hiding front brake cables.

Figure 23:
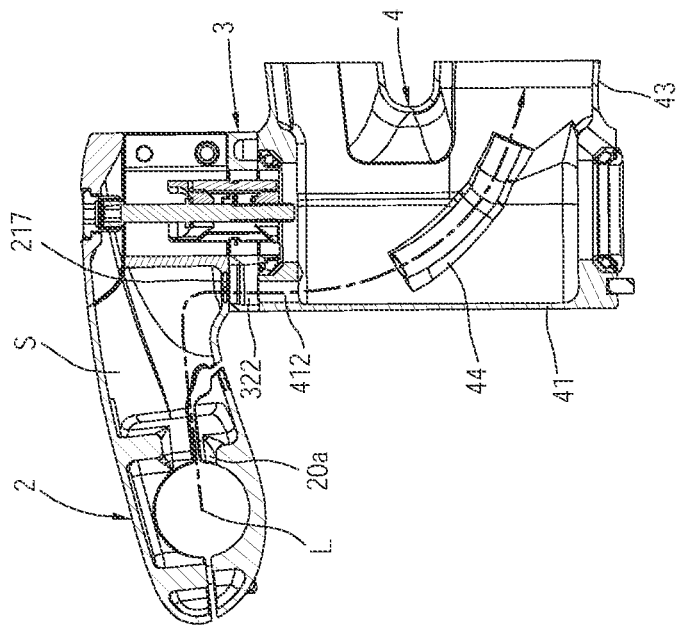

The cable arrangement shown in FIG. 23 includes inserting the cable L into the receiving space S of the stem 2 through the first hole 20a of the stem 2, sequentially passing the cable L through the communicating hole 217 of the stem 2, the second hole 322 of the spacer 3 and the through hole 412 of the head tube 41 to be inserted into the head tube 41, and then pulling the cable L to the down tube 43 of the frame 4 by passing through the guiding tubes 44 of the frame 4. With the guiding tubes 44, the cable L could be arranged at a fixed position in the frame 4, so that it is favorable to prevent the cable L from being shaken to collide with the frame 4 during bicycle riding, or being cut during steering, whereby to reduce noise and extend the service life of the cable L. In practice, if the diameter of the cable L is made wider, the cable L could be directly pulled into the down tube 43 of the frame 4 without passing through the guiding tubes 44. Such a cable arrangement is suitable for hiding front shift cables, rear shift cables, rear brake cables, or control cables of the seat tube.

Figure 24:
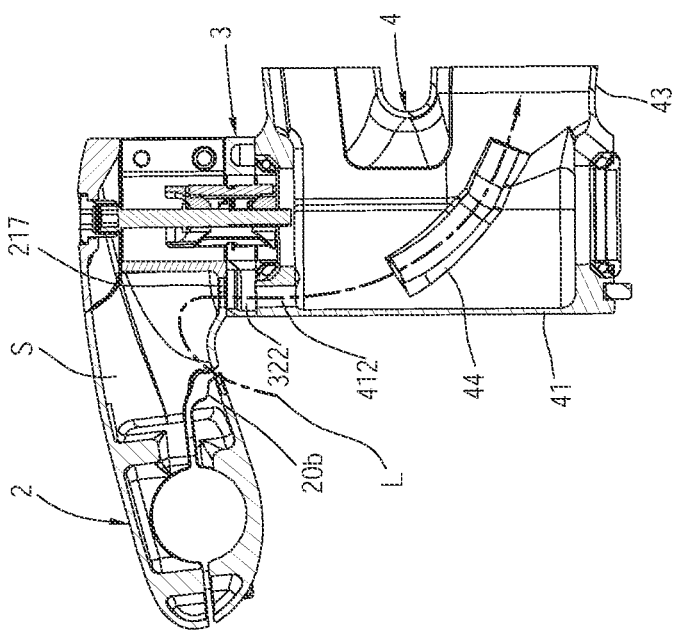

The cable arrangement shown in FIG. 24 is almost the same as the cable arrangement shown in FIG. 23, except that the cable L is inserted into the receiving space S of the stem 2 via the second hole 20b of the stem 2. Subsequently, the cable L is pulled into the head tube 41 by passing through the communicating hole 217 of the stem 2, the second hole 322 of the spacer 3 and the through hole 412 of the head tube 41, and then be pulled the down tube 43 of the frame 4 by passing through the guiding tubes 44 of the frame 4. In practice, if the diameter of the cable L is made wider, the cable L could be directly pulled into the down tube 43 of the frame 4 as well. Such a cable arrangement is also suitable for hiding front shift cables, rear shift cables, rear brake cables, or control cables of the seat tube.

It is worth mentioning that, according to the aforementioned design, the present disclosure not only provides various cable arrangements for a driver to freely choose, but also provides the design on the communicating hole 217 of the stem 2, the second hole 322 of the spacer 3, and the through hole 412 of the head tube 41, each of which is curved in shape and has a specific width, such that the cable L could be slightly moved in the communicating hole 217, the second hole 322 of the spacer 3, and the through hole 412 of the head tube 41 based on a rotation range of the head during steering. In addition, such a curved shape is designed to be matched with the rotation range of the head, which could reduce the twist and the distortion of the cable, and prevent the cable from being cut, whereby not only extending the service life of the cable but also increasing the safety of the driver during riding. In practice, depending on the required demand, the communicating hole 217, the second hole 322 of the spacer 3, and the through hole 412 of the head tube 41 could be designed to have a central angle of no less than 45 degrees and no greater than 135 degrees and have a maximum width of no less than 3 mm and no greater than 30 mm.

Also, the communicating hole 217 of the stem 2, the second hole 322 of the spacer 3, and the through hole 412 of the head tube 41 are respectively spaced from the engaging hole 216 of the stem 2, the first hole 312 of the spacer 3, and the upper mounting hole 411 of the head tube 41, whereby the cable and the steering tube 52 of the fork 5 could be separately disposed in different spaces, so that the cable could be prevented from being directly in contact with and being rubbed against the steering tube 52 during steering. In this way, the head could steer more smoothly, and the service life of the cable could be extended, and the safety of the driver during riding could be increased as well. However, the distance between the communicating hole 217 of the stem 2 and the engaging hole 216 of the stem 2, the distance between the second hole 322 of the spacer 3 and the first hole 312 of the spacer 3, and the distance between the through hole 412 of the head tube 41 and the upper mounting hole 411 of the head tube 41 are not limited by the aforementioned design, but could be no less than 0.1 mm and no greater than 30 mm in other embodiments, as long as the structural strength of the head would not be affected Moreover, since the first blocking portion 414 of the head tube 41 is curved in shape, and the second blocking portion 53 of the fork 5 is located in the first blocking portion 414 as shown in FIG. 19, the second blocking portion 53 could move along the first blocking portion 414 when the driver controls the head to steer to make the fork 5 rotate. When the head is steered to a certain angle, the second blocking portion 53 could abut against a wall of the first blocking portion 414 to restrict the driver to increase the steering angle, so that the head could be prevented from being oversteered, enhancing the safety of the driver during riding. Once the head is oversteered, the cable would be pulled or abutted against other components of the head, which may shorten the service life of the cable. In other words, the aforementioned design that avoids oversteering could extend the service life of the cable.

It is worth mentioning that, in other embodiments, the first blocking portion could be designed to have a curved shape with a central angle of no less than 45 degrees and no greater than 135 degrees and a maximum width of no less than 3 mm and no greater than 30 mm, wherein the second blocking portion could be designed to be matched with the first blocking portion, whereby to provide a better blocking effect. In addition, the position of the first blocking portion and the position of the second blocking portion are not limited by the aforementioned design. In other embodiments, the second blocking portion could be disposed on the head tube, and the first blocking portion could be disposed on the fork.

Also, the advantage of forming the spacer 3 to include materials having different elastic coefficients is that, since the first section 31 is mainly used to be engaged with the stem 2 and the head tube 41, the material of the first section 31 which is hard and has a relatively low elastic coefficient could ensure the physical strength and extend the service life of the first section 31; since the second section 32 is mainly used to form the second hole 322 being passed through by the cable, the material of the second section 32 which has a relatively high elastic coefficient could prevent the cable from being damaged due to contact and rub against other hard objects for a long time, extending the service life of the cable.

It is worth mentioning that, in order to achieve the above effects, the spacer 3 could be manufactured by injection molding. More specifically, the first section 31 of the spacer 3 having the first hole 312 is made first, and the second section 32 could be coated on the first section 31 to form the second hole 322 by injection molding.

Figure 25:
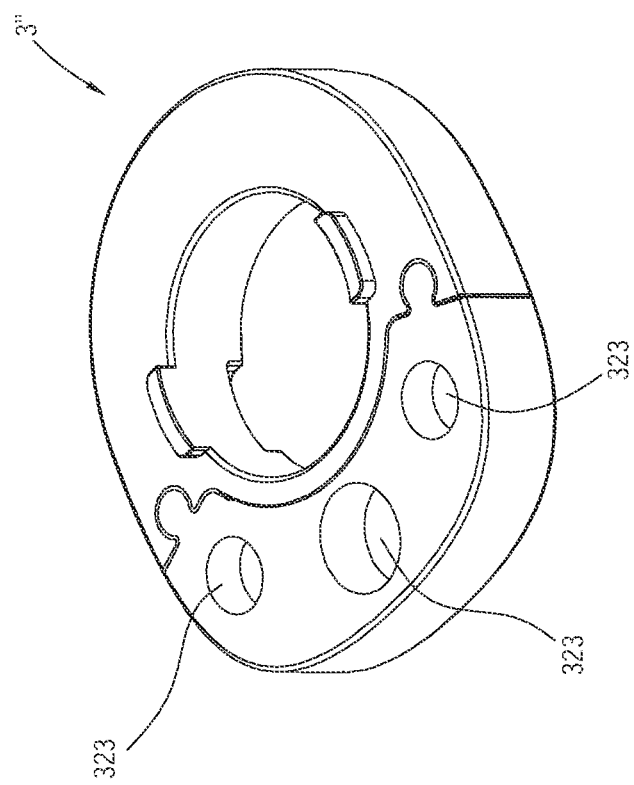
FIG. 25 is a perspective view of the spacer according to another embodiment of the present disclosure.

In addition, the shape of the spacer is not limited to be curved. As shown in FIG. 25, a spacer 3" is provided with a plurality of second holes 323, wherein three second holes 323 are illustrated in FIG. 25 as an example. The second holes 323 are recommended to be no less than 3 mm and no greater than 20 mm, so that the cable could easily pass through the second holes 323.

Figure 26:
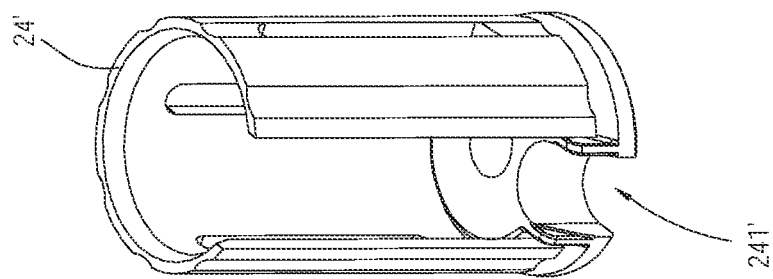
FIG. 26 is a perspective view of the expander according to another embodiment of the present disclosure.

It is worth mentioning that, the expander is not limited by the aforementioned design, but could be an expander 24' shown in FIG. 26, which also has a cable passage 241' adapted to be passed through by the cable. A width of the cable passage 241' is recommended to be no less than 2 mm and no greater than 10 mm, so that the cable could easily pass through the cable passage 241'.

It must be pointed out that the embodiments described above are only some preferred embodiments of the present disclosure. All equivalent structures which employ the concepts disclosed in this specification and the appended claims should fall within the scope of the present disclosure.

What is claimed is:

1. A stem of a bicycle, wherein the bicycle includes a handlebar, a frame including a head tube, and a fork; the stem has a receiving space therein; an end of the stem has a first clamping member and a second clamping member, wherein the first clamping member is adapted to be engaged with the second clamping member to fix the handlebar; another end of the stem has an engaging hole communicating with the receiving space; the stem has a bottom portion; the engaging hole is formed on the bottom portion of the stem; the head tube has a top portion and a bottom portion, wherein the top portion has an upper mounting hole, and the bottom portion has a lower mounting hole; the fork includes a steering tube, which sequentially passes through the lower mounting hole, the upper mounting hole, and the engaging hole to be connected to the stem, so that the stem is engaged with the steering tube and is located on the top portion of the head tube; the stem is characterized in that:

when the stem is engaged with the steering tube and is located on the top portion of the head tube, the bottom portion of the stem faces the top portion of the head tube; the bottom portion of the stem further comprises a communicating hole formed thereon with a curved shape, wherein the communicating hole and the engaging hole are disposed apart from each other, and the communicating hole is closer to the handlebar than the engaging hole, and the communicating hole communicates with the receiving space of the stem;

wherein the stem further comprises an expander disposed in the steering tube of the fork and is located in the engaging hole; a fixing bolt is screwed with the expander, so that an outer diameter of the expander expands to be tightly fixed in the steering tube, wherein the expander has at least one cable passage; the at least one cable passage communicates with the receiving space via the engaging hole, and is capable of being passed through by a cable which enters an inside of the steering tube via the receiving space.

2. The stem of claim 1, further comprising a body and a top cap, wherein the body has the engaging hole and the communicating hole; the top cap covers the engaging hole from a top of the body, and fixedly covers the body, wherein an inner surface of the top cap facing the engaging hole and a portion of the body which is provided with the engaging hole are spaced from each other by a gap.

3. The stem of claim 2, wherein a shape of the top cap matches with a shape of the body, and a top surface of the top cap is a substantially smooth surface, which is adapted to lower a wind resistance.

4. The stem of claim 2, wherein the gap between the top cap and the body is no less than 3 mm.

5. The stem of claim 1, wherein the communicating hole has a central angle of no less than 45 degrees and no greater than 135 degrees.

6. The stem of claim 5, wherein a maximum width of the communicating hole is no less than 3 mm and no greater than 30 mm.

7. The stem of claim 1, wherein a gap between the engaging hole and the communicating hole is no less than 0.1 mm and no greater than 30 mm.

8. The stem of claim 1, wherein a width of the at least one cable passage of the expander is no less than 2 mm and no greater than 10 mm.

9. A cable routing system of a bicycle, comprising:

a stem including a body and a top cap, wherein the body has a bottom portion, an engaging hole, and a communicating hole formed on the bottom portion, and wherein the communicating hole has a curved shape; the engaging hole and the communicating hole are disposed on the bottom portion of the body of the stem and are arranged apart from each other, and the communicating hole is disposed in front of the engaging hole in a riding direction; a shape of the top cap matches with a shape of the body; the top cap fixedly covers the body; the top cap and the body are enclosed to form a receiving space communicating with the engaging hole;

a frame including a head tube, wherein the head tube has a top portion and a bottom portion; the top portion has an upper mounting hole, and the bottom portion has a lower mounting hole;

a fork including a steering tube, wherein the steering tube sequentially passes through the lower mounting hole, the upper mounting hole, and the engaging hole to be connected to the stem, so that the stem is engaged with the steering tube and is located on the top portion of the head tube; the bottom portion of the body of the stem faces the top portion of the head tube;

an expander which is disposed in the steering tube of the fork by being screwed with a fixing bolt, wherein the expander has at least one cable passage, which communicates with the receiving space and the engaging hole; and at least one cable, wherein the at least one cable extends into the steering tube from outside by passing through the receiving space of the stem and the at least one cable passage; an end of the at least one cable is connected to a bicycle controller, and another end thereof is connected to a bicycle component.

10. The cable routing system of claim 9, wherein the bicycle further comprises at least one spacer disposed between the stem and the head tube; the at least one spacer has a first hole; the steering tube sequentially passes through the head tube and the first hole of the at least one spacer to be connected to the stem; the at least one spacer further comprises at least one second hole; the at least one second hole and the first hole are disposed on and spaced from each other by a distance, wherein the at least one second hole communicates with the head tube of the frame and the receiving space of the stem.

11. The cable routing system of claim 10, wherein the stem has a first positioning portion, and the at least one spacer has a second positioning portion which is adapted to be engaged with the first positioning portion.

12. The cable routing system of claim 11, wherein a side surface of the at least one spacer opposite to the second positioning portion is disposed with a third positioning portion, which is adapted to be engaged with a second positioning portion of another spacer.

13. A stem of a bicycle, wherein the bicycle includes a handlebar, a frame including a head tube, and a fork; the stem has a receiving space therein; an end of the stem is connected to the handlebar; another end of the stem has an engaging hole communicating with the receiving space; the stem has a bottom portion; the engaging hole is formed on the bottom portion of the stem; the head tube has a top portion and a bottom portion, wherein the top portion has an upper mounting hole, and the bottom portion has a lower mounting hole; the fork includes a steering tube, which sequentially passes through the lower mounting hole, the upper mounting hole, and the engaging hole to be connected to the stem, so that the stem is engaged with the steering tube and is located on the top portion of the head tube; the stem is characterized in that:

when the stem is engaged with the steering tube and is located on the top portion of the head tube, the bottom portion of the stem faces the top portion of the head tube; the bottom portion of the stem further comprises a communicating hole formed thereon with a curved shape, wherein the communicating hole and the engaging hole are disposed apart from each other, and the communicating hole is closer to the handlebar than the engaging hole, and the communicating hole communicates with the receiving space of the stem;

wherein the stem further comprises an expander disposed in the steering tube of the fork and is located in the engaging hole; a fixing bolt is screwed with the expander, so that an outer diameter of the expander expands to be tightly fixed in the steering tube, wherein the expander has at least one cable passage; the at least one cable passage communicates with the receiving space via the engaging hole, and is capable of being passed through by a cable which enters an inside of the steering tube via the receiving space.

* * * * *